(12) United States Patent
Manz et al.

(10) Patent No.: US 10,038,348 B2
(45) Date of Patent: Jul. 31, 2018

(54) LINER, STATOR ASSEMBLY AND ASSOCIATED METHOD

(71) Applicant: Regal Beloit America, Inc., Beloit, WI (US)

(72) Inventors: Alan Jacob Manz, Paulding, OH (US); Bryan James Stout, Fort Wayne, IN (US)

(73) Assignee: Regal Beloit America, Inc., Beloit, WI (US)

( * ) Notice: Subject to any disclaimer, the term of this patent is extended or adjusted under 35 U.S.C. 154(b) by 288 days.

(21) Appl. No.: 14/824,574

(22) Filed: Aug. 12, 2015

(65) Prior Publication Data

US 2017/0047807 A1 Feb. 16, 2017

(51) Int. Cl.
*H02K 3/34* (2006.01)
*H02K 15/02* (2006.01)
*H02K 15/085* (2006.01)

(52) U.S. Cl.
CPC ........... *H02K 3/345* (2013.01); *H02K 15/024* (2013.01); *H02K 15/085* (2013.01)

(58) Field of Classification Search
CPC ..... H02K 15/085; H02K 3/345; H02K 15/024
USPC ....................................................... 310/215
See application file for complete search history.

(56) References Cited

U.S. PATENT DOCUMENTS

| 2,716,724 | A | 8/1955 | Burian Kurt |
| 4,151,436 | A | 4/1979 | Smith |
| 4,247,978 | A | 2/1981 | Smith |
| 4,274,025 | A | 6/1981 | Nerurkar et al. |
| 4,351,103 | A | 9/1982 | Rodenbeck |
| 5,306,976 | A | 4/1994 | Beckman |
| 5,428,258 | A | 6/1995 | Mowery |
| 5,680,692 | A | 10/1997 | Kliman et al. |
| 5,877,574 | A | 3/1999 | Molnar |
| 6,282,773 | B1 * | 9/2001 | Luttrell .................. H02K 15/10 29/564.6 |
| 6,930,427 | B2 | 8/2005 | Grant et al. |
| 7,078,843 | B2 | 7/2006 | Du et al. |
| 7,952,251 | B2 | 5/2011 | Chretien et al. |
| 8,531,076 | B2 | 9/2013 | Stabenow et al. |
| 8,823,236 | B2 * | 9/2014 | Ishikawa .................. H02K 3/12 310/195 |
| 8,946,970 | B2 | 2/2015 | Knapp et al. |
| 2004/0061409 | A1 | 4/2004 | Grant et al. |
| 2004/0145267 | A1 | 7/2004 | Lowry et al. |
| 2008/0282531 | A1 | 11/2008 | Rahman et al. |

(Continued)

*Primary Examiner* — Forrest M Phillips
(74) *Attorney, Agent, or Firm* — John Wagley

(57) ABSTRACT

A liner for use for a resilient stator of an electric machine for positioning between teeth formed in the stator. The stator is conformable from a first generally extending shape with opposed spaced apart ends and to a second generally hollow circular shape. The liner includes a central portion for positioning in a cavity between the adjacent teeth, a first end portion for limiting motion of the liner extending from the central portion and adapted to cooperate with a first end face of the stator, and a second end portion extending from the central portion and cooperating with a second end face of the stator, opposed to the first end face. The first end portion limits motion of the liner. The liner is positioned between adjacent teeth when the stator is in the first shape and remains in the cavity when the stator is in the second shape.

18 Claims, 15 Drawing Sheets

(56) References Cited

U.S. PATENT DOCUMENTS

| | | | |
|---|---|---|---|
| 2009/0102311 A1* | 4/2009 | Kotani | H02K 3/345 |
| | | | 310/215 |
| 2011/0095641 A1 | 4/2011 | Rhoads et al. | |
| 2011/0175485 A1* | 7/2011 | Naganawa | H02K 1/146 |
| | | | 310/214 |
| 2012/0161570 A1 | 6/2012 | Schutten et al. | |
| 2013/0009512 A1* | 1/2013 | Tashiro | H02K 3/522 |
| | | | 310/215 |
| 2013/0033132 A1* | 2/2013 | Jayasoma | H02K 1/148 |
| | | | 310/43 |
| 2013/0270959 A1* | 10/2013 | Kreidler | H02K 1/148 |
| | | | 310/215 |
| 2014/0154113 A1 | 6/2014 | Yin et al. | |
| 2014/0175937 A1* | 6/2014 | Coldwate | H02K 3/34 |
| | | | 310/215 |
| 2014/0210300 A1* | 7/2014 | Wang | H02K 1/16 |
| | | | 310/208 |
| 2015/0054376 A1 | 2/2015 | Sheth | |
| 2015/0311761 A1* | 10/2015 | Hattori | H01B 3/52 |
| | | | 310/215 |

* cited by examiner

LINER, STATOR ASSEMBLY AND ASSOCIATED METHOD

BACKGROUND OF THE INVENTION

The embodiments described herein relate generally to electrical machines, and more specifically, to a stator having a liner.

An electric machine is typically in the form of an electric generator or an electric motor. The machine typically has a centrally located shaft that rotates relative to the machine. Electrical energy applied to coils within the motor initiates this relative motion which transfers the power to the shaft and, alternatively, mechanical energy from the relative motion of the generator excites electrical energy into the coils. For expediency the machine will be described hereinafter as a motor. It should be appreciated that a motor may operate as a generator and vice versa.

A stationary assembly, also referred to as a stator, includes a stator core and coils or windings positioned around portions of the stator core. It is these coils to which energy is applied to initiate this relative motion which transfers the power to the shaft. These coils are formed by winding wire, typically copper, aluminum or a combination thereof, about a central core to form the winding or coil.

In an assembled configuration the coils are positioned in a spaced apart relationship about the stationary assembly that typically has a generally hollow cylindrical configuration with the coils positioned internally. The power of the electric motor is dependent on the amount of energy that may be applied to the coils and that amount of energy is proportional to the amount of wire that may be positioned about the stationary assembly. The amount of wire positioned about the stationary assembly is typically referred to as the slot fill. Placing as much wire in the coils as possible, also known as maximizing the slot fill is thus desirable.

Of many methods of manufacturing the stator and winding the wire to form the coil in particular, the following three methods are typical. The first is to form a rigid hollow cylindrical core with internal protrusions of teeth around which the coils are wound. The core is typically produced by stacking a plurality of rigid hollow laminations and joining them to form the rigid hollow cylindrical core. This method requires the wire to be fed around the teeth with a device called a needle. The need to provide for movement of the needle around the teeth limits the amount of wire that may be used to form the coil.

A second method is to similarly form a rigid hollow cylindrical core with internal protrusions of teeth and to provide spools or bobbins that may be removably secured to the teeth of the core. The coils are formed by winding wire around the coils while separated from the stator and then by assembling the wound bobbins onto the teeth of the stator. The separated coils provide improved access around the coil to more completely form the coil.

A third known method of manufacturing a stationary assembly includes stacking a plurality of laminations and rolling the stack to form a round stator. The laminations are stamped from a sheet of stock material and stacked to form a substantially linear array of stator sections and connecting members. The substantially linear array includes a first end and a second end. Teeth are formed along one side of the linear array. Windings may be wound on the stator sections around the teeth while the laminations are in the linear orientation in a configuration where the linear array of laminations are arched with the teeth positioned outwardly. Once the windings are positioned on the stator sections, the stack is formed into a second shape. To form the stack into the second shape, the stack is rolled around a central axis and the first end is coupled to the second end with the teeth positioned inwardly. The second shape is the substantially round shape of a stator. Typically, the second shape is maintained by securing the first end to the second end. The linear arrays provide improved access around the teeth to more completely form the coil.

Regardless of which method is used to form the stator, the coils need to be wrapped around the teeth of the stator core including the opposed ends of the stator core, which are typically the end laminations, The portions of the coils outside of the end laminations are typically called end turns. For the coils to provide the electromagnetic fields necessary to power the motor, the end turns need to be properly electrically interconnected, typically with the use of additional electrical wires (interpole connections and leads) and/or electrical connectors. Typically interpole connections need to be laced and lead ties secured to the motor. Typically end caps made of an insulating material, typically a polymer, are placed over the end laminations and are used to guide the additional electrical wires and/or electrical connectors. The end caps represent an additional cost to the motor, add to the length of the motor and limit the paths of the additional electrical wires resulting in complex and tortuous wire paths.

The present invention is directed to alleviate at least some of these problems with the prior art,

BRIEF DESCRIPTION OF THE INVENTION

According to an embodiment of the invention, a liner for use for a resilient stator of an electric machine for positioning between teeth formed in the stator is provided. The stator is conformable from a first generally extending shape with opposed spaced apart ends and to a second generally hollow circular shape. The liner includes a central portion for positioning in a cavity between the adjacent teeth, a first end portion for limiting motion of the liner extending from the central portion and adapted to cooperate with a first end face of the stator, and a second end portion extending from the central portion and cooperating with a second end face of the stator, opposed to the first end face, The first end portion limits motion of the liner. The liner is positioned between adjacent teeth when the stator is in the first shape and remains in the cavity when the stator is in the second shape.

According to an aspect of the invention, the liner may be provided such that the liner is formed from a singular sheet of insulating material, According to another aspect of the invention, the liner may be provided such that at least one of the first end portion and the second end portion include a lip for cooperation with the respective end face of the stator, According to yet another aspect of the invention, the liner may be provided such that the central portion defines a longitudinally extending rib extending from the first end portion to the second end portion, According to yet another aspect of the invention, the liner may be provided such that the central portion defines a opening extending from the first end portion to the second end portion.

According to an embodiment of the invention, a stator assembly is provided. The assembly includes a body defining a plurality of teeth extending from the body. The body is comformable from a first generally extending shape with first and. second opposed ends to a second shape in which the opposed ends are moved toward each other to provide the second shape with a generally hollow circular configuration, The assembly also includes a plurality of liners. At least one of the plurality of liners including a central portion for positioning between adjacent teeth formed in the stator, a first end portion extending from the central portion, and a. second end portion extending from the central portion. The assembly includes an electrically conductive wire. At least a portion of the wire is wound around one of the teeth of the body and around a portion of at least two liners to form a coil. The body, the wire, and at least a portion of the plurality of liners are adapted to provide for the forming of the coil while the body is in the first shape and to provide for the conforming of the body to the second shape after at least one of the coils has been wound around one of the teeth of the body and around. a portion of the at least two liners.

According to another aspect of the invention, the stator assembly may be provided such that the generally extending shape is a generally linearly extending shape.

According to another aspect of the invention, the stator assembly may be provided such that the plurality of liners include a plurality of insulating cuffs, According to another aspect of the invention, the stator assembly may be provided wherein the body includes a plurality of laminations.

According to another aspect of the invention, the stator assembly may be provided wherein the body is welded in the second generally hollow circular shape after being so formed into the hollow circular shape.

According to another aspect of the invention, the stator assembly may be provided wherein the body includes a plurality of living hinges positioned between adjacent teeth, According to another aspect of the invention, the stator assembly may be provided wherein the liner is formed from a singular sheet of insulating material.

According to another aspect of the invention, the stator assembly may be provided wherein at least one of the first end portion and the second end portion include a lip for cooperation with the respective end face of the body.

According to another aspect of the invention, the stator assembly may be provided wherein the central portion of the liner defines a longitudinally extending rib extending from the first end portion to the second end portion.

According to another aspect of the invention, the stator assembly may be provided wherein the central portion of the liner defines an opening extending from the first end portion to the second end portion.

According to another embodiment of the invention, a method for making an electric machine is provided. The method includes the steps of providing a generally extending and at least partially resilient body with first and second opposed and spaced apart ends and defining a plurality of teeth extending from the body, providing a plurality of insulating cuffs, inserting at least one of the plurality of cuffs in a cavity formed between adjacent teeth of the body, providing wire for use in the stator assembly, winding the wire around at least one of the teeth of the body and around a portion of at least two cuffs to form a coil, moving the first and second ends of the body toward each other to form a generally hollow circular shape, and assembling a rotor into the stator to form the electric machine.

According to an aspect of the present invention, the method may be provided wherein the step of providing a generally extending and at least partially resilient body includes providing a providing a generally linearly extending and at least partially resilient body.

According to another aspect of the present invention, the method may be provided wherein the step of providing the body includes providing a plurality of laminations.

According to another aspect of the present invention, the method may further include the step of welding the body once the second generally hollow circular shape is so formed.

According to another aspect of the present invention, the method may be provided wherein the step of providing the body further includes providing a plurality of living hinges positioned between adjacent teeth.

According to another aspect of the present invention, the method may further include the step of providing an electronic control for controlling the flow of an electrical current to the coils.

According to another embodiment of the invention, an electric machine is provided. The electric machine includes a body defining a plurality of teeth extending therefrom and a plurality of liners. At least one of the plurality of liners positioned between adjacent teeth of the plurality of teeth. At least one of the plurality of liners including a central portion for positioning between adjacent teeth formed in the stator, a first end portion extending from the central portion, and a second end portion extending from the central portion. The electric machine also includes an electrically conductive wire. At least a portion of the wire is wound around one of the teeth of the body and around a portion of at least two cuffs to form a coil. The electric machine also includes a rotor that is rotatably cooperable with the stator and an electronic control for controlling the flow of an electrical current to the coils.

DETAILED DESCRIPTION OF THE INVENTION

The method, systems and apparatus described herein facilitate the winding of wire to form a coil within an electric machine, Wire is wound around teeth or bobbins to folio coils. To optimize wire fill and motor power the wire is optimally uniformly wound with adjacent wires in a closely uniformly packed relationship. Difficulties may occur maintaining this Closely uniformly packed relationship. Added care may alleviate difficulties with such closely uniformly packed relationship, but may reduce productivity and add costs to the electric machine.

The methods, systems, and apparatus described herein assist in the proper closely uniformly packed relationship of the wires within motor coils. The methods, systems, and apparatus described herein may also facilitate assembly speed and accuracy. Furthermore, the methods, systems, and apparatus described herein provide for an improved appearance of the motor and its appeal to the customer, Technical effects of the methods, systems, and apparatus described herein include at least one of improved performance and quality and reduced labor costs.

Figure 1:
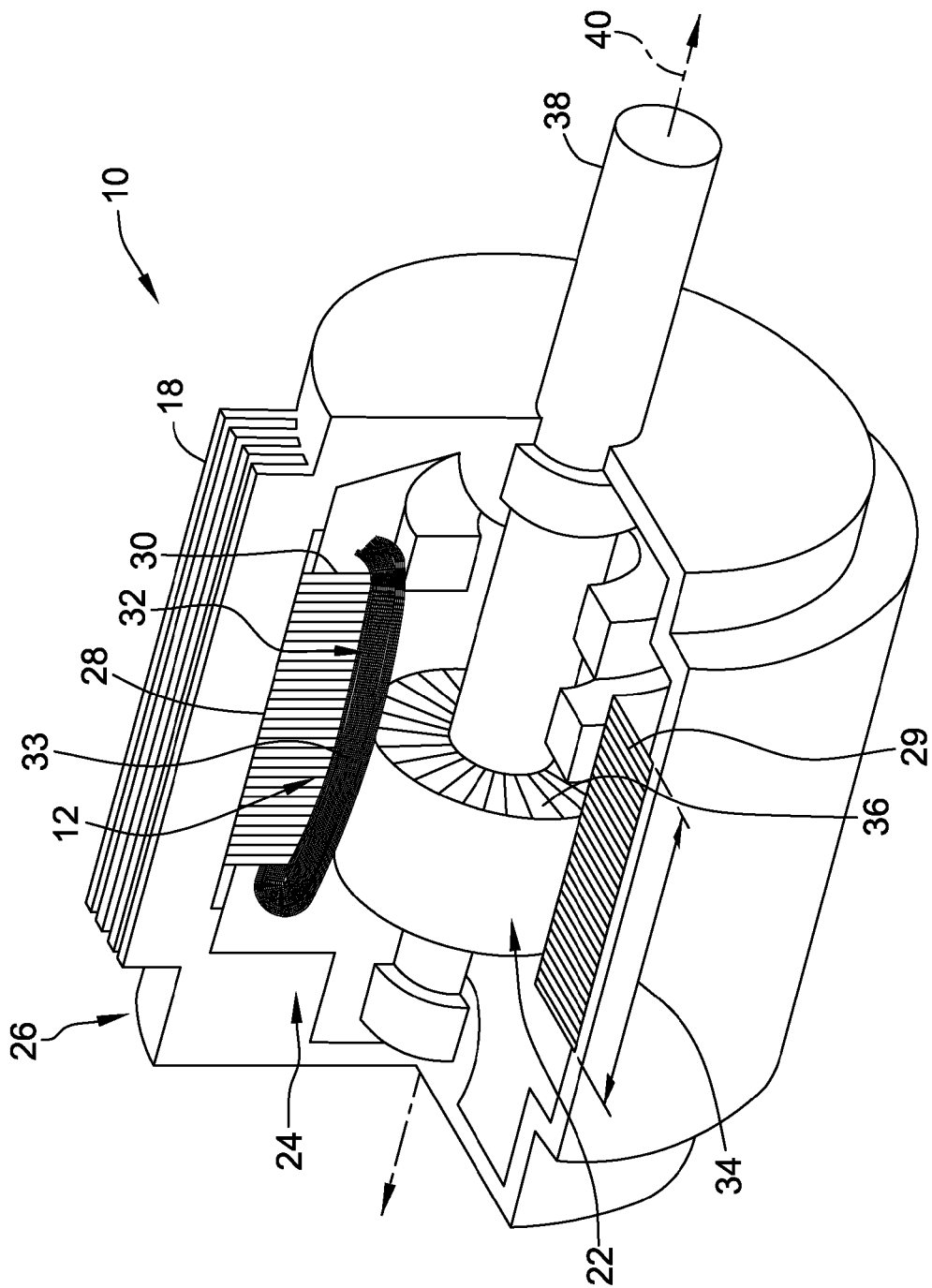
FIG. 1 is a perspective view of an embodiment of the present invention in the form of an electric machine.

FIG. 1 is a perspective cut-away view of an exemplary electric machine 10 that includes a stationary assembly 12. Electric machine 10 also includes a machine assembly housing 18 and a rotatable assembly 22, Machine assembly housing 18 defines an interior 24 and an exterior 26 of machine 10 and is configured to at least partially enclose and protect stationary assembly 12 and rotatable assembly 22. Stationary assembly 12 includes a stator core 28, which includes a plurality of stator teeth 30. Wire 33 is wound around stator teeth 30 to form each of a plurality of windings 32. In an exemplary embodiment, stationary assembly 12 is a three phase salient pole stator assembly, The stationary assembly 12 may include any number of teeth 30. For a three phase salient pole stator assembly, teeth in a multiple of three is preferred. For example there may be for example 9, 12, 15, 18, 21 or 24 teeth. As shown, the stationary assembly 12 includes eighteen (18) teeth 30.

Stator core 28 is formed from a stack of laminations 29 made of a highly magnetically permeable material, and windings 32 are wound on stator core 28 in a manner known to those of ordinary skill in the art. Laminations 29 are stacked such that stator core 28 reaches a predefined length 34. In the exemplary embodiment, the plurality of laminations 29 that form the stator core 28 may be either interlocked or loose laminations. In an alternative embodiment, stator core 28 is a solid core. For example, stator core 28 may be formed from a soft magnetic composite (SMC) material, a soft magnetic alloy (SMA) material, and/or a powdered ferrite material using a sintering process. In another alternate embodiment, the windings 32 are wound around a plurality of spools (not shown), each of which is removably fitted to one of the stator teeth 30.

In one embodiment, rotatable assembly 22 includes a permanent magnet rotor core 36 and a shaft 38 and is configured to rotate around an axis of rotation 40. In the exemplary embodiment, rotor core 36 is formed from a stack of laminations 29 made of a magnetically permeable material and is substantially received in a central bore of stator core 28, While FIG. 1 is an illustration of a three phase electric motor, the methods and apparatus described herein may be included within machines having any number of phases, including single phase and multiple phase electric machines.

In the exemplary embodiment, electric machine 10 is coupled to a fan (not shown) for moving air through an air handling system, for blowing air over cooling coils, and/or for driving a compressor within an air conditioning/refrigeration system. More specifically, machine 10 may be used in air moving applications used in the heating, ventilation, and air conditioning (HVAC) industry, for example, in residential applications using ⅓ horsepower (hp) to I hp motors or greater and/or in commercial and industrial applications and hermetic compressor motors used in air conditioning applications using higher horsepower motors, for example, but not limited to using ⅓ hp to 7.5 hp motor or greater. Although described herein in the context of an air handling system, electric machine 10 may engage any suitable work component and be configured to drive such a work component. Alternatively, electric machine 10 may be coupled to a power conversion component, for example, an engine, a wind turbine rotor, and/or any other component configured to rotate rotatable assembly 22 to generate electricity using electric machine 10.

Figure 2:
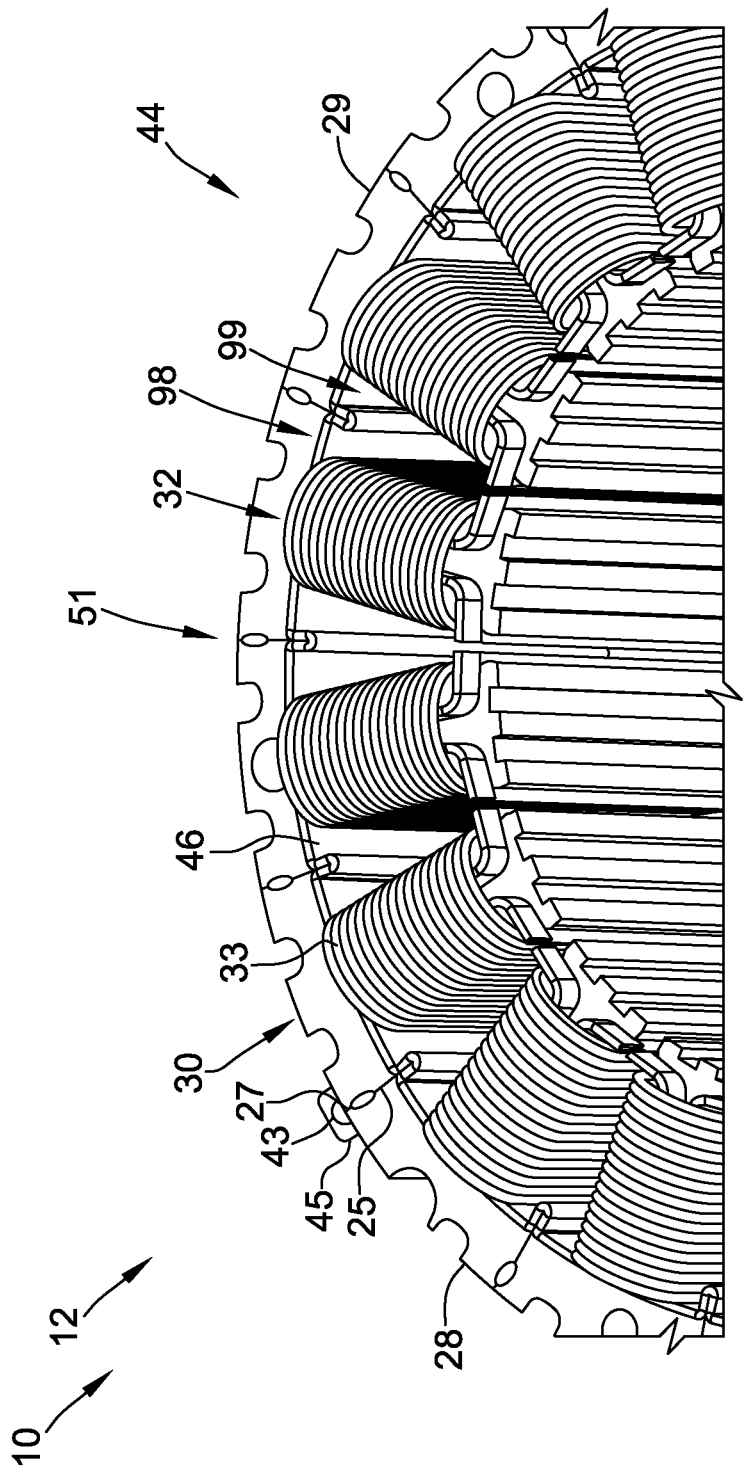
FIG. 2 is a partial perspective view of the roll-up stator assembly of the electric machine of Figure I rolled into an assembled configuration.
Figure 3:
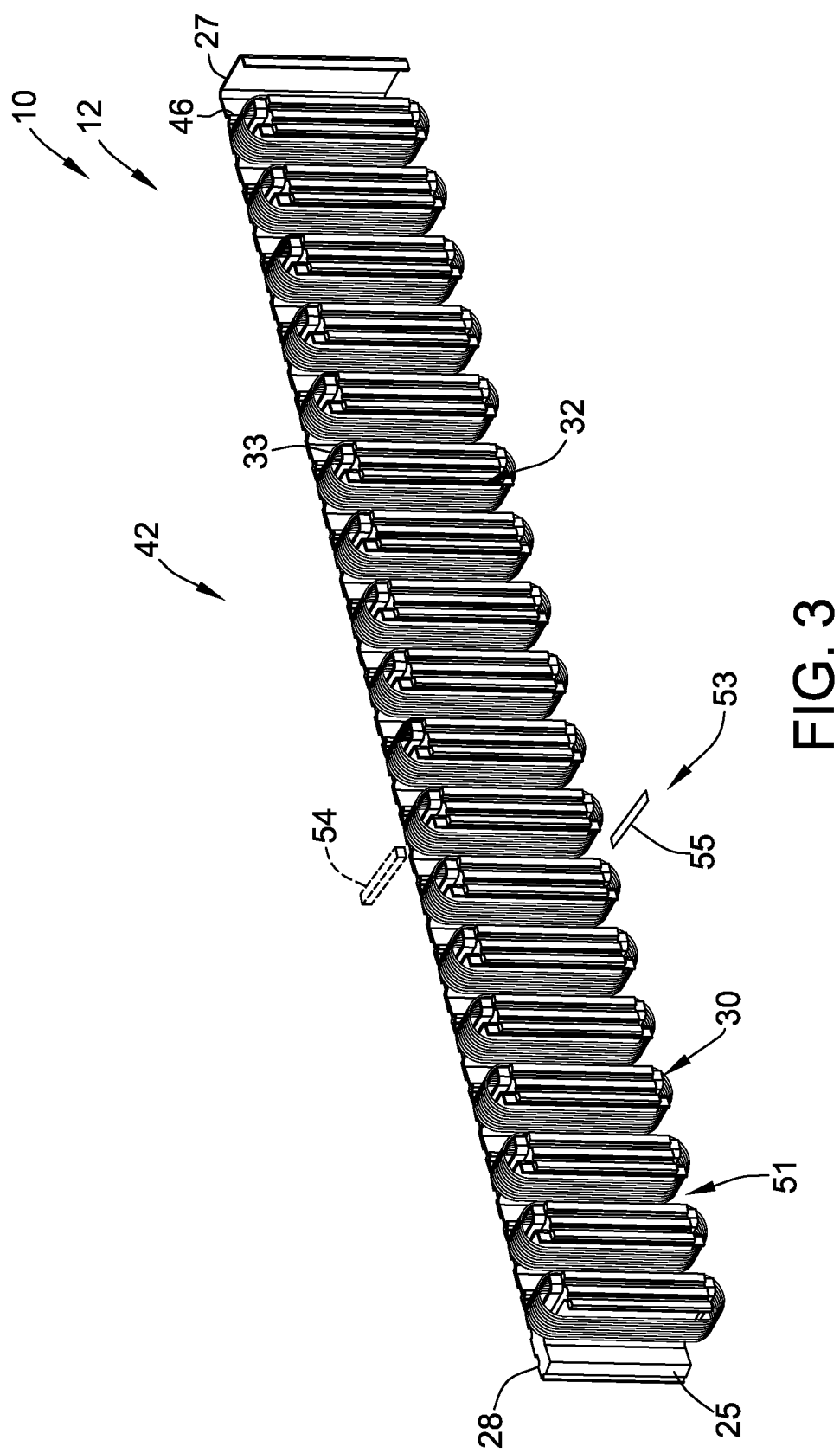
FIG. 3 is a perspective view of the roll-up stator assembly of FIG. 2 in an un-rolled configuration to permit the winding of the wire onto the stator.

According to an embodiment of the present invention and referring to now to FIG. 2, the stationary or stator assembly 12 includes a body or stator core 28 defining the plurality of teeth 30 extending from the body 28. The body has a first end 25 and an opposed second end 27. The body 28 is conformable from a first generally extending shape 42, as shown in FIG. 3, to a second generally hollow circular shape 44, as shown in FIG. 2, buy adjoining the first end 25 to the second end 27 of the body 28. The stator assembly 12 may be provided wherein the body is joined at the ends 25 and 27 in the second generally hollow circular shape 44 after being so formed into its circular shape 44. A weld 43 may be positioned where the ends 25 and 27 of the body 28 are joined to form the circular shape 44. The weld 43 may be replaced with or assisted by a mechanical latch or hook 45 positioned where the ends 25 and 27 of the body 28 are joined to form the circular shape 44.

The stator assembly 12 also includes a plurality of inserts or liners 46. The liners 46 serve to at least partially electrically isolate the electrical current from the magnetic core. The liners 46 further serve to protect the coils 32 from the edges of the laminations 29. The liners 46 may alternatively be in the form of cuffs.

As shown in FIG. 3, at least one of the plurality of liners 46 includes a central portion 48 for positioning between adjacent teeth 30 formed on the stator core or body 28. The at least one of the plurality of liners 46 includes a first end portion 50 extending from the central portion 48. The at least one of the plurality of liners 46 includes a second end portion 52 extending from the central portion 48. As shown in FIG. 3, the stator assembly 12 also includes electrically conductive wire 33. At least a portion of the wire 33 is wound around one of the teeth 30 of the body 28 and around a portion of at least two liners 46 to form the coil 32. The body 28, the wire 33, and at least a portion of the plurality of liners 46 are adapted to provide for the forming of the coil 32 while the body 28 is in the first generally extending shape 42 and to provide for the conforming of the body 28 to the second generally hollow circular shape 44 after at least one of the coils 32 has been wound around one of the teeth 30 of the body 28 and around a portion of at least two liners 46.

The first generally extending shape 42 of the stator core 28, as shown in FIGS. 3-7, permits easier forming or winding of the wire 33 around the teeth 30 to form the windings 32. The easier forming is due to added access to the teeth 30 by providing cavities 51 between adjacent teeth 30 which are larger than the cavities available from a circular shape. The larger cavities 51 permit winding equipment including tools 53 including for example fingers 55 to enter the cavities 51 to wind the wires 533 into the windings 32. The tools 53 may also include liner supports 54 to support the liners 46 during winding so that they are not crushed. The large cavities 51 permit the windings 32 to be large enough, even when room is made for the fingers 55 to wind the windings 32, to fully fill the cavities 51 when the stator assembly 12 is returned to the second generally hollow circular shape 44, as shown in FIG. 2.

It should be appreciated that the first generally extending shape 42 of the stator core 28 may, as shown in FIGS. 3-6, be a generally linearly extending shape. Alternatively, other shapes including an arcuate shape Where the teeth 30 are positioned internally and the ends 25 and 27 are separated from each other or a shape is an arcuate shape (not shown) where the teeth 30 are positioned externally and the ends 25 and 27 are separated from each other may be used. In a position where the shape is an arcuate shape where the teeth 30 are positioned externally may provide for cavities 51 that provide addition room for the fingers 55 to wind the windings 32.

It should be appreciated that the liners 46 may be made of an insulating material, for example a polymer, for example polyethylene terephthalate (PET) and is available as Mylar®, a trademark of Dupont Tejjin Films DuPont Teijin Films U.S. Limited Partnership, 3600 Discovery Drive, Chester, Va. 23836. Mylar® may be available in sheet form with thickness of for example 0.030-0.003 inches, for example 0.010 inches.

Referring now to FIG. 3-7 and according to another aspect of the invention, the stator assembly 12 may be provided wherein the body 28 includes pliable regions 56 which typically are positioned between adjacent teeth 30. The pliable regions 56 may be elastically pliable. The body 28 may be made of a plurality of laminations 29 which are stacked together to form the body 28. While the laminations 29 may be made of any suitable durable material, the laminations 29 may be made of sheet metal and made as a stamping.

The pliable regions 56 form living hinges 58 to permit the stator assemble to be assembled in the first generally extending shape 42 and to provide for the conforming of the body 28 to the second generally hollow circular shape 44. For example, a plurality of living hinges 58 may be formed in the laminations 29, with each of the living hinges 58 positioned between adjacent teeth 30. The living hinges 58 may have any suitable shape that results in pliable regions 56 and may provide for a reduced cross section at the hinges so that the lamination may be elastically deformed in that pliable region. The transition to and from the reduced cross section is preferably smooth or gentle to minimize stress risers in the living hinges 58. For example, the living hinges may include openings with large radii 60 to minimize stress risers.

Referring again to FIG. 6, the stator core 28 of the stator assembly 12 includes the plurality of laminations 29 that are stacked together along opposed faces of the laminations 29. The laminations 29 may have any suitable shape and may, as shown, include similar or identical portions 64 positioned between adjacent pliable regions 56 created by the living hinges 58. The portions 64 may include a base 66 and a stem 68 extending from the base 66. A flange 70 may extend from the distal end of the stem 68. The bases 66 of the portions 64 may, as shown, be arcuate to assist in forming the second generally hollow circular shape 42 of the stator core 28. Adjacent portions 64 form the cavities 51 between the portions 64. The liners 46 are adapted to fit to a liner support surface 72 defining each of the cavities 51.

Figure 6:
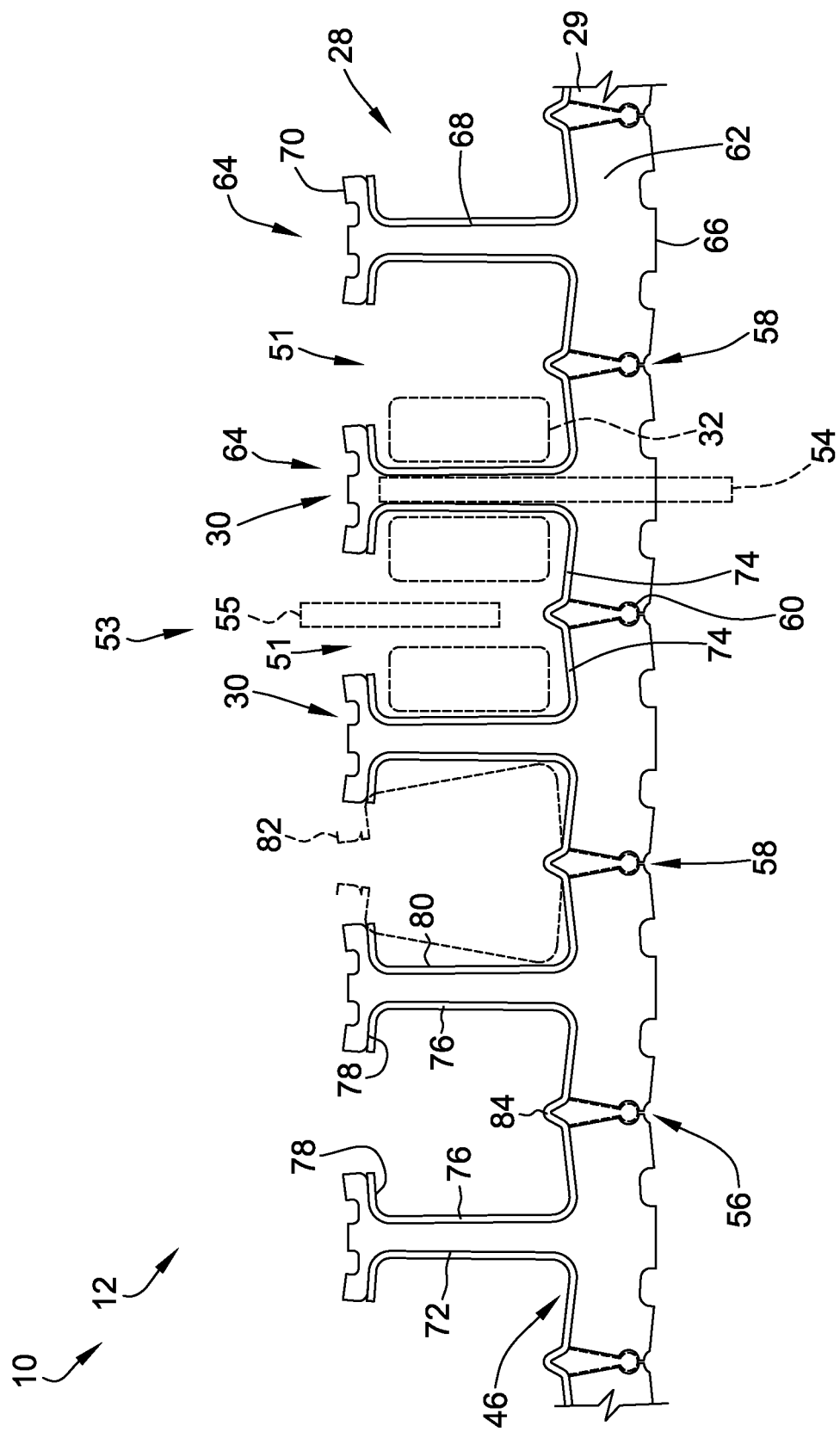
FIG. 6 is a cross sectional view of FIG. 5 along the line 6-6 in the direction of the arrows.

As shown in FIG. 6, the central portion 48 of the liner 46 may be in intimate contact with the liner support surface 72 of the core 28. The liner 46 may include spaced apart base contacting portions 74 that contact the base 66 of the laminations 29. The liner 46 may also include spaced apart stem contacting portions 76 that contact the stem 68 of the laminations 29. The liner 46 may also include spaced apart flange contacting portions 78 that contact the flange 70 of the laminations 29, As shown in FIG. 6, the liner 46 is adapted to be moveable from first position 80 as shown in solid, wherein the stator may be in the first generally extending shape 42 to a second position 82, as shown in phantom, wherein the stator may be in the second generally hollow circular shape 44, To accommodate the flexing of the liner 46 from the first position 80 to the second position 82, the liner may further include a flexing feature 84, The flexing feature 84 may be positioned between the spaced apart base contacting portions 74. The flexing feature 84 may be in the form of two accordion portions that are connected by a living hinge to each other and to the spaced apart base contacting portions 74. The two accordion portions may define a longitudinally extending rib extending from the first end portion 50 to the second end portion 52.

Figure 4:
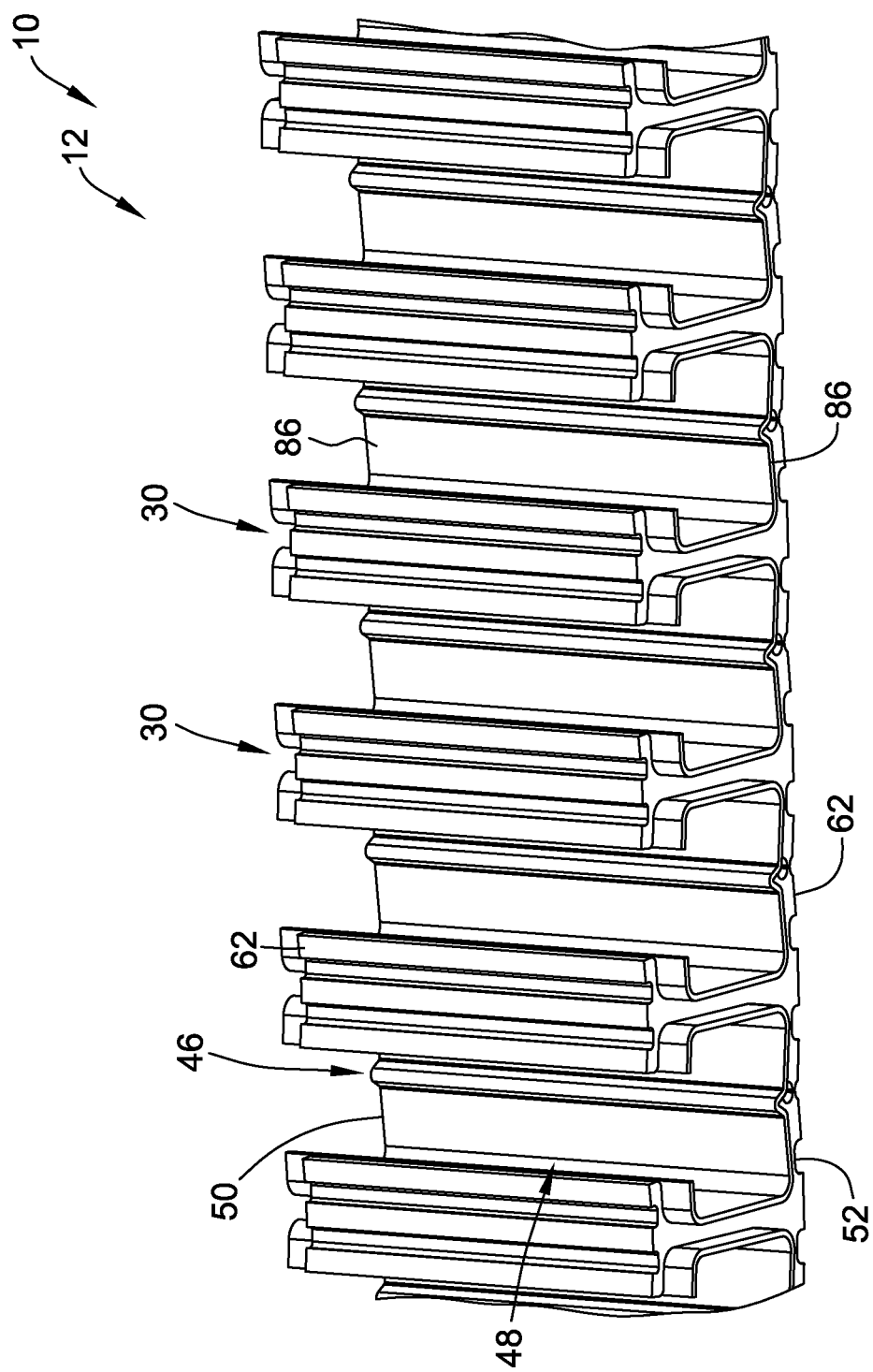
FIG. 4 is a partial perspective view of the roll-up stator sub assembly of FIG. 3 in the un-rolled configuration without the wire coils and with the liners.
Figure 5:
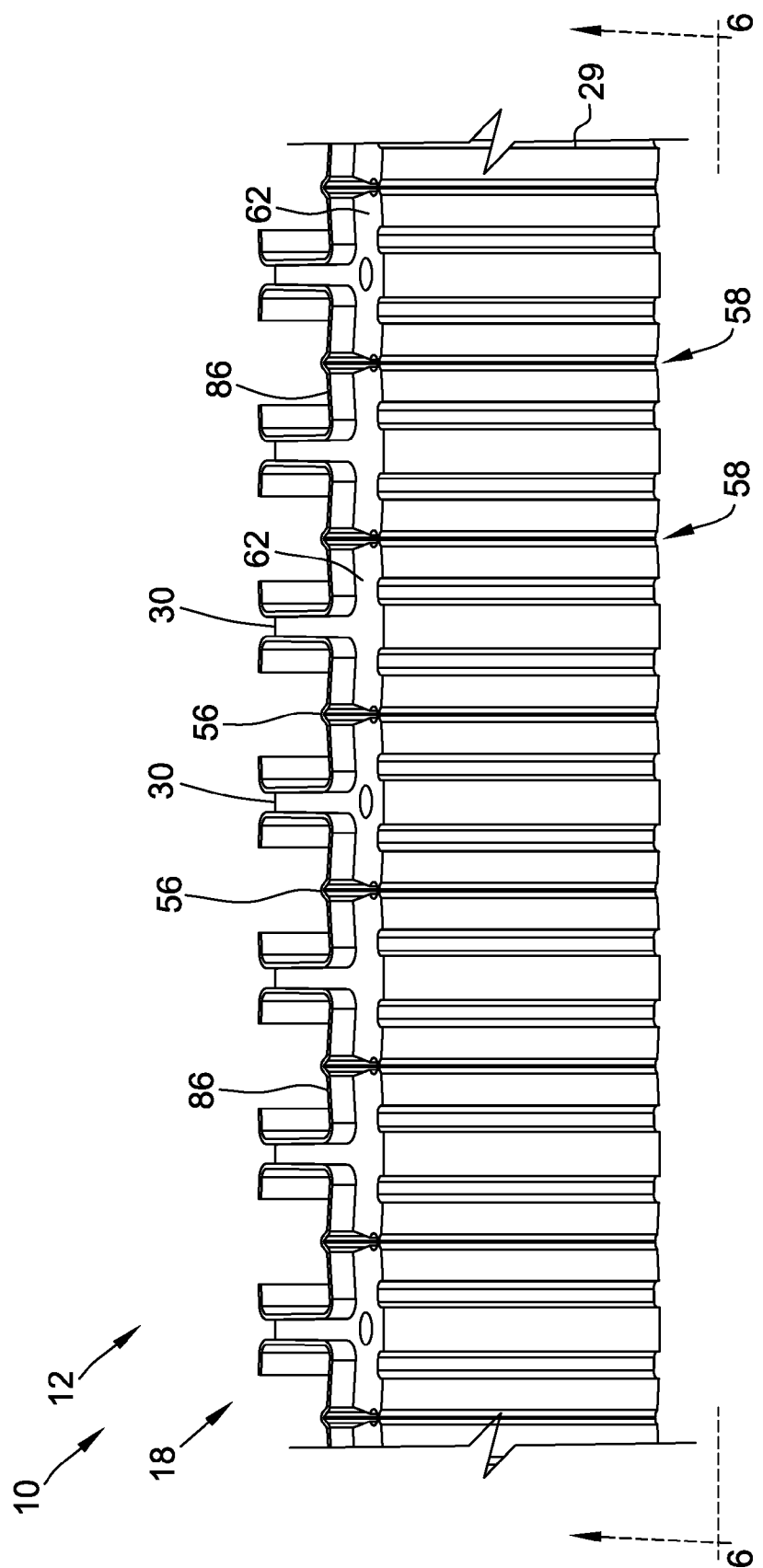
FIG. 5 is another partial perspective view of the roll-up stator sub assembly of FIG. 3 in the un-rolled configuration.

As shown in FIGS. 4 and 5, the first end portion 50 of the liner 46 cooperates with face 62 of the first of the laminations 29 and the second end portion 52 of the liner 46 cooperates with face 62 of the last of the laminations 29. The first end portion 50 and second end portion 52 may include a folded over lip portion 86 for cooperation with the faces 62.

Figure 7:
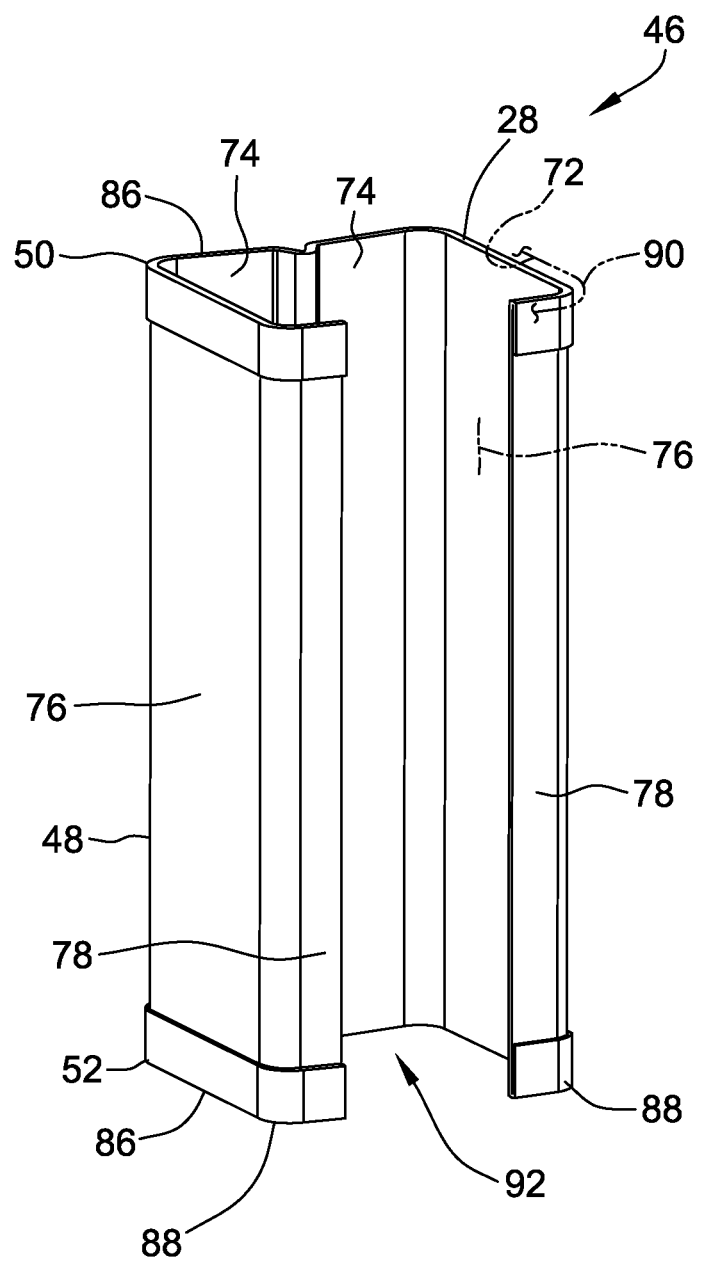
FIG. 7 is a perspective view of a cuff liner for use in the electric machine of FIG. 1.
Figure 8:
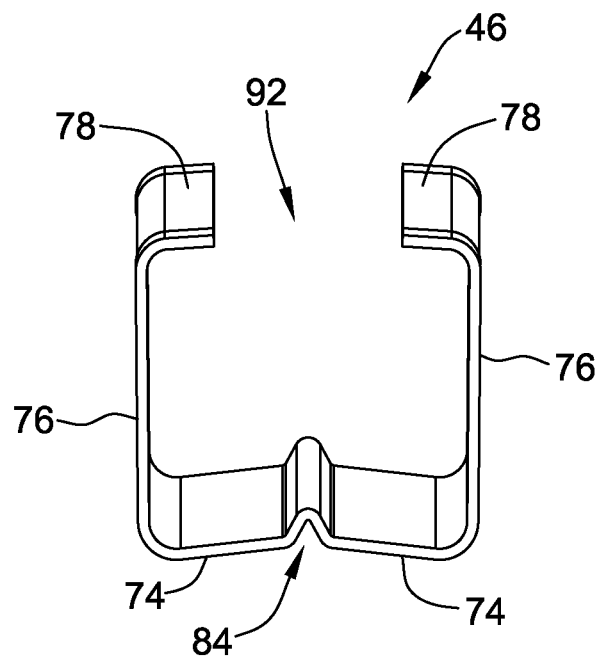
FIG. 8 is a partial perspective view of the cuff liner of FIG. 7.
Figure 9:
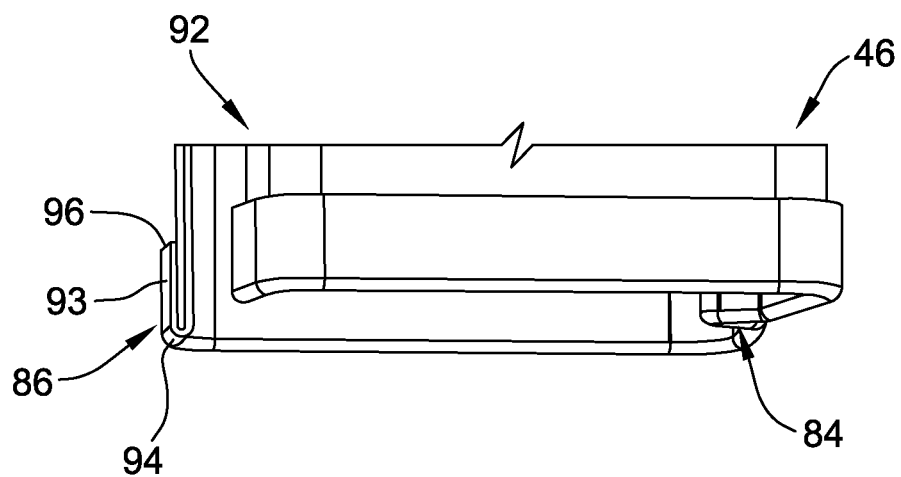
FIG. 9 is another partial perspective view of the cuff liner of FIG. 7.
Figure 10:
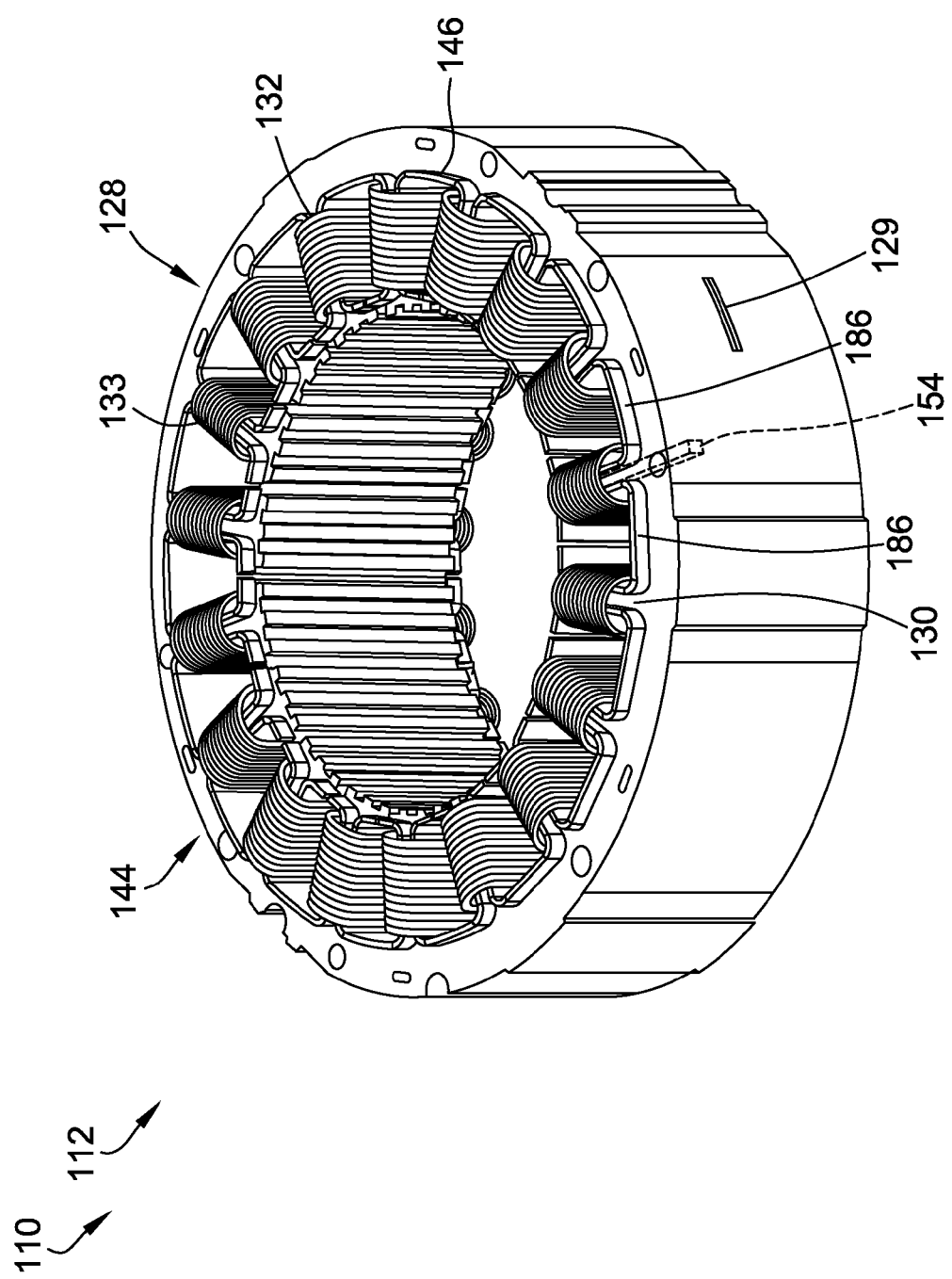
FIG. 10 is a perspective view of an 18 pole rigid stator assembly that may be used in the electric machine of FIG. 1.

According to another embodiment of the invention and referring now to FIGS. 7-9, liner 46 for use for resilient stator 28 of electric machine 10 for positioning between teeth 30 formed in the stator 28 is provided. The stator 28 is conformable from a first generally extending shape with opposed spaced apart ends and to a second generally hollow circular shape. The liner 46 includes a central portion 48 for positioning in a cavity 51 between the adjacent teeth 30, a first end portion 50 for limiting motion of the liner extending from the central portion 48 and adapted to cooperate with a first end face 62 of the stator 28, and a second end portion 52 extending from the central portion 48 and cooperating with a second end face 62 of the stator 28, opposed to the first end face 62. The first end portion 50 and the second end portion 52 limit motion of the liner 46. The liner 46 is positioned between adjacent teeth 30 when the stator 28 is in the first shape 42 and remains in the cavity 51 when the stator 28 is in the second shape 44.

As shown in FIGS. 7-9, the liner 46 may further include corner relief features 88. The corner relief features 88 provide clearance for radii or chamfers 90 formed in the liner support surface 72 of the stator core 28, so that the contacting portions 74, 76 and 78 of liner 46 may be in intimate contact with the liner support face 72.

As shown in FIGS. 7-9, the liner 46 may further include an axially extending opening 92 to provide for the ability of the liner 46 to conform to both first position 80 and second position 82 (see FIG. 6). The axially extending opening 92 may extend from and through the first end portion 50 to and through the second end portion 52.

The liner 46 may he made in any suitable fashion and may as described above be made of Mylar. The liner may be formed from a singular sheet of insulating material. The liner sheet may be bent or formed into the shape shown in FIGS. 7-9 manually or with a machine and with our without tooling (not shown).

The folded over lip portion 86 for cooperation with the faces 62 may, as shown in FIG. 9, include an extension 93 that is folded over at bend 94 to form the lip portion 86. The end of the extension 93 defines a rim 96 for engaging the stator core 28. The lip portion 86 and the extension 93 in particular may he pliable or plastically deformable so that the liners 46 may be inserted into the cavities 51 and then the lip portions 86 extend over the stator core 28 so that the rim 96 engages the core 28 securing the liners 46 in position in the cavities 51.

Referring again to FIGS. 3 and 6, liner supports 54 are placed between the lip portions 86 of adjacent liners 46 to support the liners when the wire 33 is wrapped around the teeth 30 to form the coils 33. The liner supports 54 are later removed after the winding process is complete, providing space for providing end turns and connections.

Referring again to FIG. 2, after all of the coils 32 are wound and the stator core 28 is rolled/welded, electrical connections 98 connecting the coils 32 are positioned. The electrical connections 98 may be in the form of interpole connections that may be positioned by being laced. Clearance 99 under the coils 32, where the tools 53 including the liner supports were used, provides space to lace the coils and interpole connections 98 together. Phase-to-phase shorts may be reduced since, with using the liners 46 instead of end caps (not shown) provides improved handling of the wire since the leads will not be required to make sharp 90° bends as they are routed around the endcap posts to begin and end each coil.

Additionally, one of the three phases can be routed on the end of the stator opposite the other two. Phase-to-ground shorts may be reduced since, with using the liners 46 instead of end caps (not shown) provides additional clearance between the windings and stator core by eliminating the moisture wicking path that is present between the existing end cap and slot liner design. According to another embodiment of the present invention and referring to now to FIGS. 10-13, a stationary or stator assembly 112 for use in an electric machine 110 that is used in a ECM (electronically commutated motor).

An electronically commutated motor is an electric motor in which electrical current to the electromagnetic coils is pulsed on and off electronically with semi-conductor devices sometimes called electronic switches, transistors, or by various acronyms that denote their design particulars. The pulsed signals power three or more circuits or coil groups within the motor. By varying the timing and duration of pulses, the electronic controller can accomplish speed control and maintain high torque at start and over a broad speed range.

Although many types of motors can be correctly called "electronically commutated" (e.g. AC motors on electronic ASDs and switched reluctance motors), the designation ECM is usually reserved for smaller variable speed motors that operate from a single-phase power source and have the electronic controller mounted in or on the motor.

Electronically commutated motors can have other features that also may be used in addition to, or instead of, ECM in their name. For example, they may or may not also be a permanent magnet motor or axial gap motor. Some are made to run directly from a DC power source. Others are made to run from an AC power source, but they rectify the AC to DC in their controllers before it is pulsed or commutated The motor 110 includes a body or stator core 128 defining the plurality of teeth 130 extending from the body 128. The body 128 has a generally hollow circular shape 144. The body 128 is generally rigid and is typically made from a plurality of stamped laminations 129. The stator assembly 112 also includes a plurality of inserts or liners 146, similar to the liners 46 of FIGS. 7-9. The liners 146 serve to at least partially electrically isolate the electrical current from the magnetic core. The liners 146 further serve to protect coils 132 from the edges of the laminations 129. The liners 146 may alternatively be in the form of cuffs.

Figure 11:
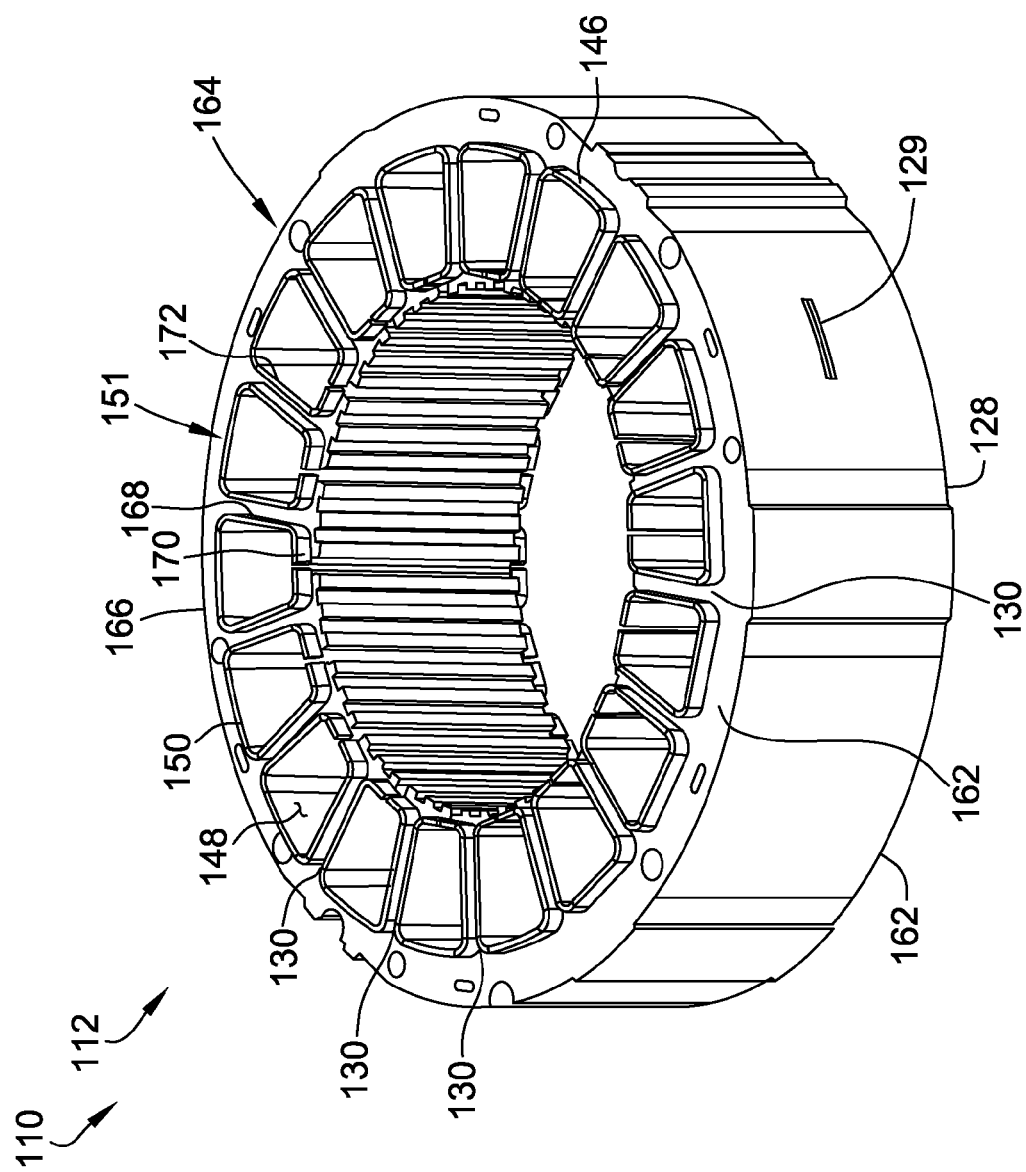
FIG. 11 is a perspective view of an 18 pole rigid stator sub assembly for use in assembling the stator assembly of FIG. 10 without the wire coils.
Figure 12:
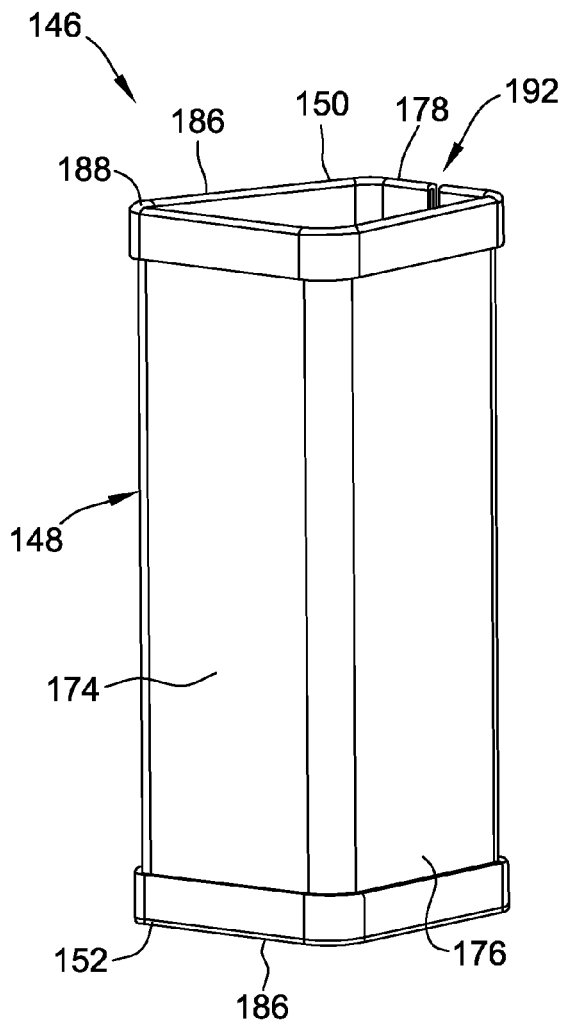
FIG. 12 is a perspective view of a cuff liner for use in the 18 pole rigid stator assembly of FIG. 10.

As shown in FIG. 11, at least one of the plurality of liners 146 includes a central portion 148 for positioning between adjacent teeth 130 formed on the stator core or body 128. The stator core 128 may include any number of teeth 30. For a three phase salient pole stator assembly, teeth in a multiple of three is preferred. For example, there may be for example 9, 12, 15, 18, 21 or 24 teeth. As shown, the stator core 128 includes eighteen (18) teeth 130, As shown in FIG. 12, at least one of the plurality of liners 146 includes a first end portion 150 extending from the central portion 148. The at least one of the plurality of liners 146 includes a second end portion 152 extending from the central portion. As shown in FIG. 11, the stator assembly 112 also includes electrically conductive wire 133. At least a portion of the wire 133 is wound around one of the teeth 130 of the body 128 and around a portion of at least two liners 146 to form the coil 132.

As shown in FIG. 11, the plurality of laminations 129 are stacked together along opposed faces of the laminations 129. The laminations 129 may have any suitable shape and may as shown include similar or identical portions 164. The portions 164 may include a base 166 and a stem 168 extending from the base 166. A flange 170 may extend from the distal end of the stem 168. Adjacent portions 164 form the cavities 151. The liners 146 are adapted to fit to a liner support surface 172 defining each of the cavities 151.

Figure 13:
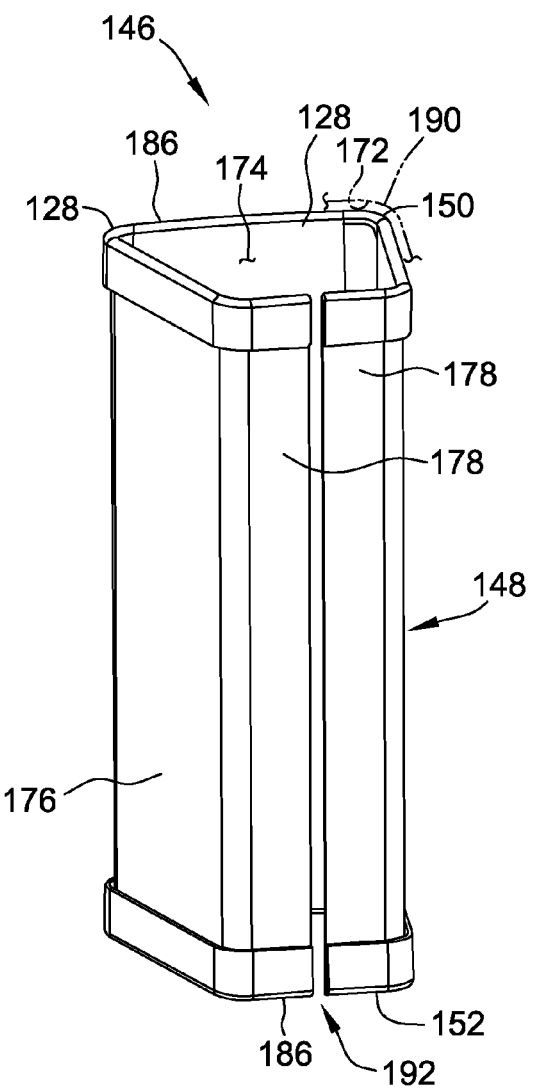
FIG. 13 is another perspective view of the cuff liner of FIG. 12.
Figure 14:
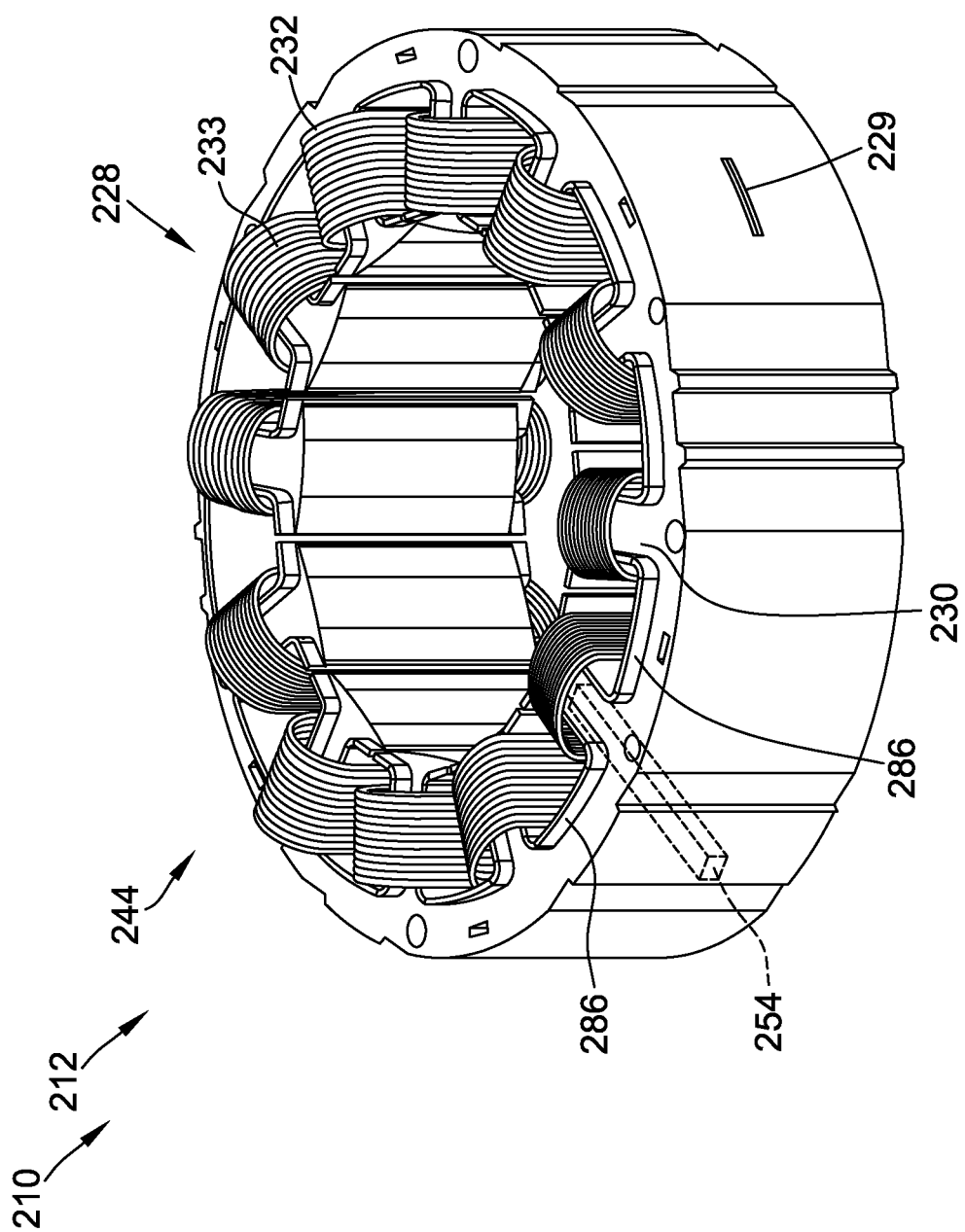
FIG. 14 is a perspective view of a 12 pole rigid stator assembly that may be used in the electric machine of FIG. 1.

As shown in FIGS. 11-13, the central portion 148 of the liner 146 may be in intimate contact with liner support surface 172 of the core 128. The liner 146 may include a base contacting portion 174 that contacts the base 166 of the laminations 129. The liner 146 may also include spaced apart stem contacting portions 176 that contact the stern 168 of the laminations 129. The liner 146 may also include spaced apart flange contacting portions 178 that contact the flange 170 of the laminations 129.

As shown in FIGS. 12-13, the liner 146 may further include corner relief features 188. The corner relief features 188 provide clearance for radii or chamfers 190 formed in the liner support surface 172 of the stator core 128, so that the contacting portions 174, 176 and 178 of liner 146 may be in intimate contact with the liner support face 172.

As shown in FIGS. 12-13, the liner 146 may further include an axially extending opening 192 to provide for the ability of the liner 146 to be flexible and conform for positioning in cavity 151 and to permit lips 186 on the end portions 150 and 152 to catch or be secured to faces 162 of the stator core 128. The axially extending opening 192 may extend from and through the first end portion 150 to and through the second end portion 152.

Referring again to FIG. 10, liner supports 154 are placed between the lip portions 186 of adjacent liners 146 to support the liners when the wire 133 is wrapped around the teeth 130 to form the coils 133. The liner supports 154 are later removed after the winding process is complete, providing space for providing end turns and connections.

According to another embodiment of the present invention and referring to now to FIGS. 14-17, a stationary or stator assembly 212 for use in an electric machine 210 that is used in a ECM (electronically commutated motor).

The motor 210 includes a body or stator core 228 defining the plurality of teeth 230 extending from the body 228. The body 228 has a generally hollow circular shape 244, The body 228 is generally rigid and is typically made from a plurality of stamped laminations 229. The stator assembly 212 also includes a plurality of inserts or liners 246, similar to the liners 146 of FIGS. 10-13. The liners 246 serve to at least partially electrically isolate the electrical current from the magnetic core. The liners 246 further serve to protect coils 232 from the edges of the laminations 229. The liners 246 may alternatively be in the form of cuffs.

As shown in FIG. 14-17, at least one of the plurality of liners 246 includes a central portion 248 for positioning between adjacent teeth 230 formed on the stator core or body 228. The stator core 228 may include any number of teeth 230. For a three phase salient pole stator assembly, teeth in a multiple of three is preferred. For example, there may be fin example 9, 12, 15, 18, 21 or 24 teeth, As shown, the stator core 228 includes twelve (12) teeth 230, The at least one of the plurality of liners 246 includes a first end portion 250 extending from the central portion 248. The at least one of the plurality of liners 246 includes a second end portion 252 extending from the central portion 248. The stator assembly 212 also includes electrically conductive wire 233. At least a portion of the wire 233 is wound around one of the teeth 230 of the body 228 and around a portion of at least two liners 246 to form the coil 232.

The plurality of laminations 229 are stacked together along opposed faces of the laminations 229. The laminations 229 may have any suitable shape and may as shown include similar or identical portions 264. The portions 264 may include a base 266 and a stem 268 extending from the base 266, A flange 270 may extend from the distal end of the stem 268. Adjacent portions 264 form the cavities 251. The liners 246 are adapted to fit to a liner support surface 272 defining each of the cavities 251.

Figure 15:
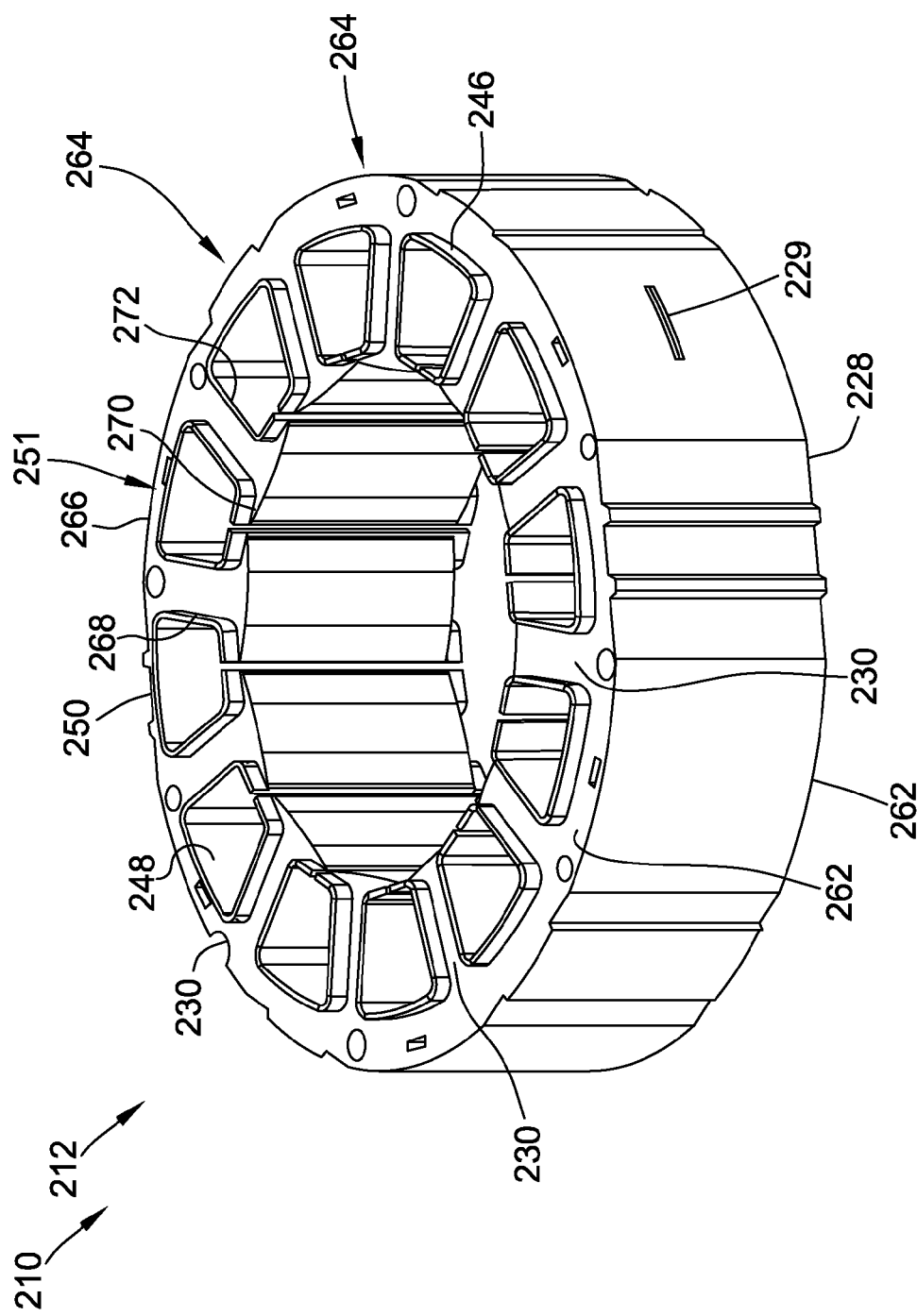
FIG. 15 is a perspective view of a 12 pole rigid stator sub assembly for use in assembling the stator assembly of FIG. 114 without the wire coils.
Figures 16, 17:
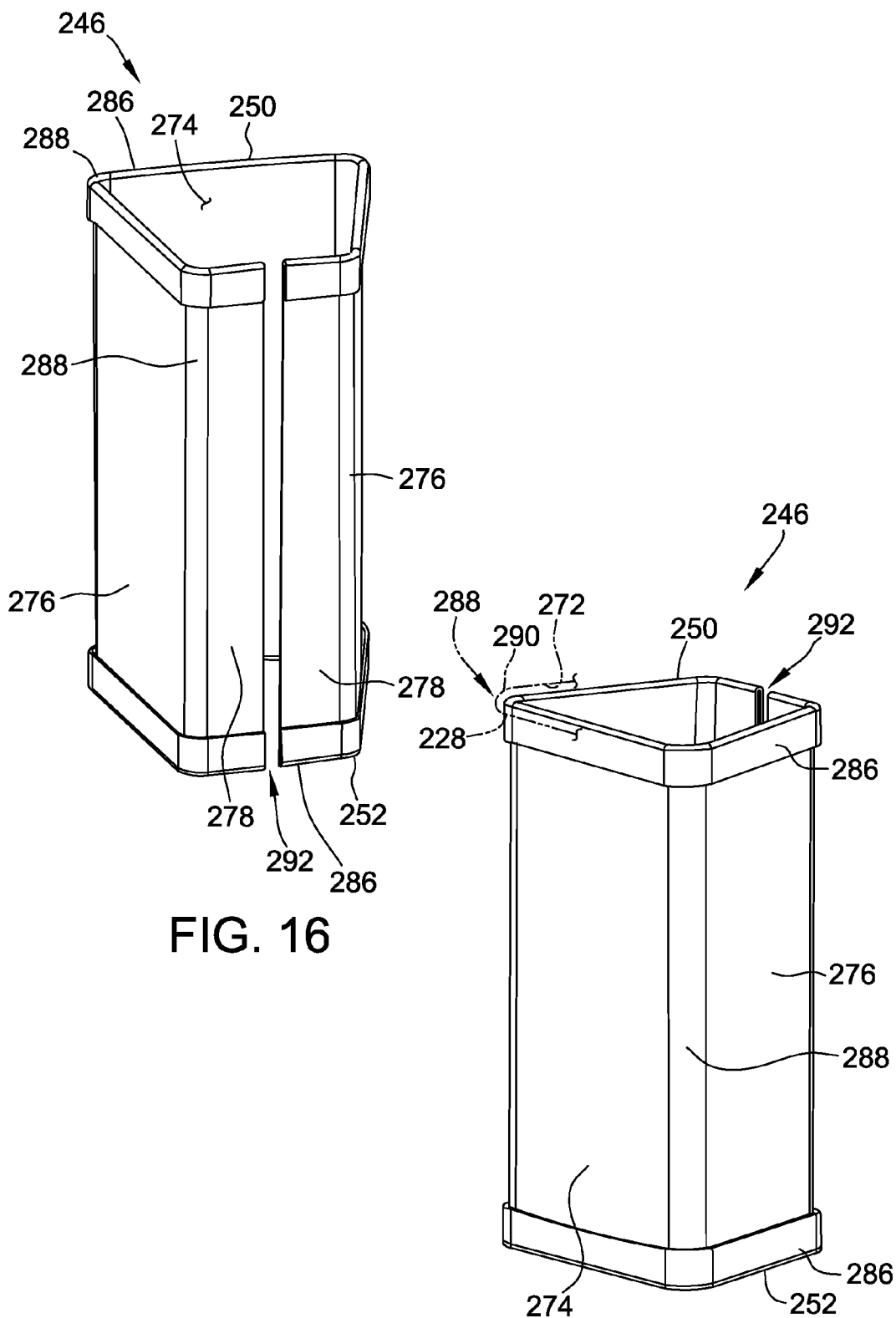
FIG. 16 is a perspective view of a cuff liner for use in the 12 pole rigid stator assembly of FIG. 14.
FIG. 17 is another perspective view of the cuff liner of FIG. 16.
Figure 18:
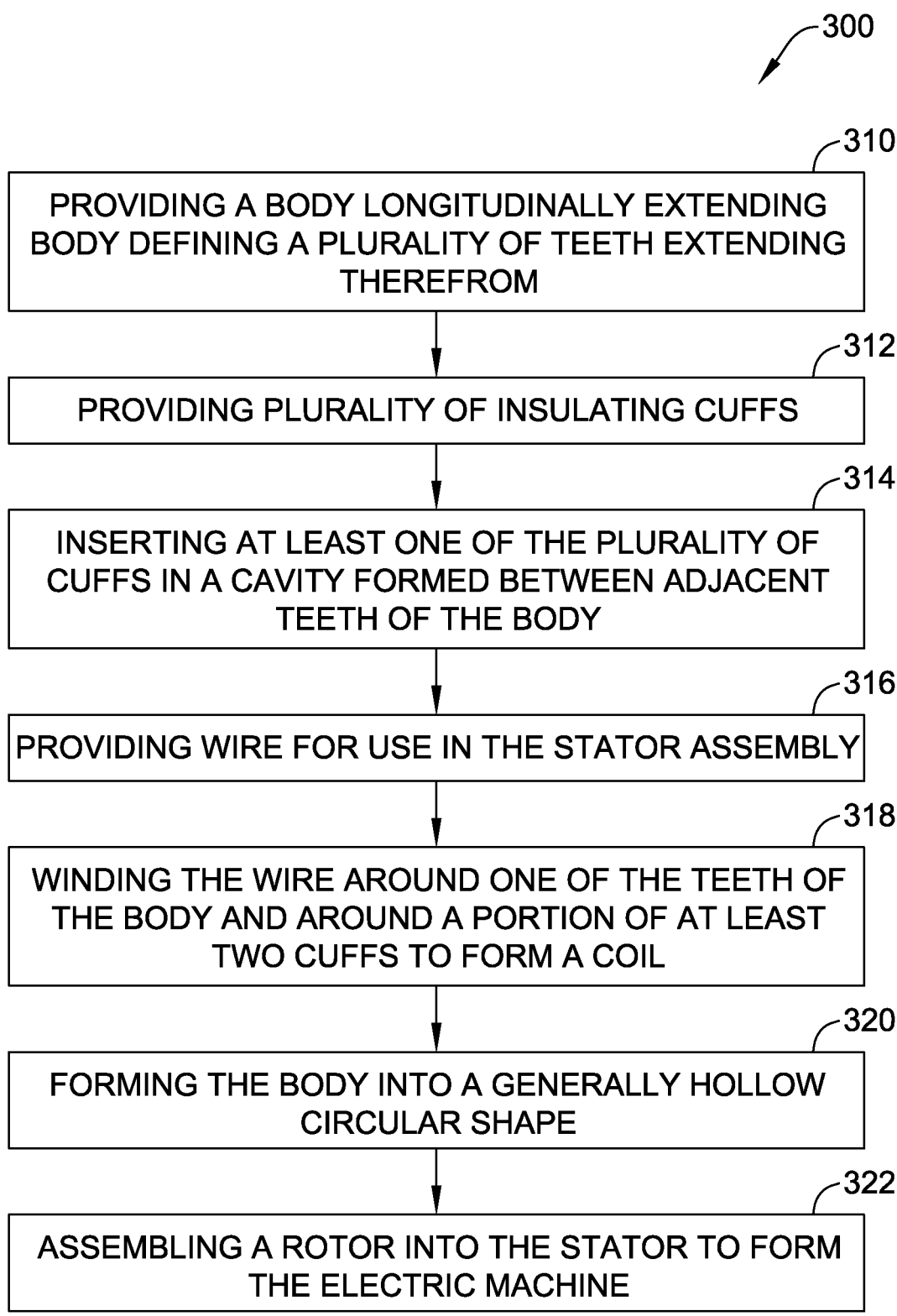
FIG. 18 is a schematic flow a of a method for making an electric machine with a cuff liner.

As shown in FIG. 15-17, the central portion 248 of the liner 246 may be in intimate contact with liner support surface 272 of the core 228. The liner 246 may include a base contacting portion 274 that contact the base 266 of the laminations 229. The liner 246 may also include spaced apart stem contacting portions 276 that contact the stem 268 of the laminations 229. The liner 246 may also include spaced apart flange contacting portions 278 that contact the flange 270 of the laminations 229.

As shown in FIGS. 14-17, the liner 246 may further include corner relief features 288. The corner relief features 288 provide clearance for radii or chamfers 290 formed in the liner support surface 272 of the stator core 228, so that the contacting portions 274, 276 and 278 of liner 246 may be in intimate contact with the liner support face 272.

As shown in FIGS. 14-17, the liner 246 may further include an axially extending opening 292 to provide for the ability of the liner 246 to be flexible and conform for positioning in cavity 251 and to permit lips 286 on the end portions 250 and 252 to catch or be secured to faces of the stator core 228. The axially extending opening 292 may extend from and through the first end portion 250 to and through the second end portion 252.

Referring again to FIG. 14, liner supports 254 are placed between the lip portions 286 of adjacent liners 246 to support the liners when the wire 233 is wrapped around the teeth 230 to form the coils 233. The liner supports 254 are later removed after the winding process is complete, providing space for providing end turns and connections.

According to another embodiment of the invention, a method 300 for making an electric machine is provided. The method 300 includes step 310 of providing a generally extending and at least partially resilient body with first and second opposed and spaced apart ends and defining a plurality of teeth extending from the body, step 312 of providing a plurality of insulating cuffs, step 314 of inserting at least one of the plurality of cuffs in a cavity formed between adjacent teeth of the body, step 316 of providing wire for use in the stator assembly, step 318 of winding the wire around at least one of the teeth of the body and around a portion of at least two cuffs to form a coil, step 320 of moving the first and second ends of the body toward each other to form a generally hollow circular shape, and step 322 of assembling a rotor into the stator to form the electric machine.

According to an aspect of the present invention, the method may be provided wherein the step of providing a generally extending and at least partially resilient body includes providing a providing a generally linearly extending and at least partially resilient body.

According to another aspect of the present invention, the method may be provided wherein the step of providing the body includes providing a plurality of laminations.

According to another aspect of the present invention, the method may further include the step of welding the body once the second generally hollow circular shape is so formed.

According to another aspect of the present invention, the method may be provided wherein the step of providing the body further includes providing a plurality of living hinges positioned between adjacent teeth.

According to another aspect of the present invention, the method may further include the step of providing an electronic control for controlling the flow of an electrical current to the coils.

According to another embodiment of the invention, an electric machine is provided. The electric machine includes a body defining a plurality of teeth extending therefrom and a plurality of liners. At least one of the plurality of liners positioned between adjacent teeth of the plurality of teeth. At least one of the plurality of liners including a central portion for positioning between adjacent teeth formed in the stator, a first end portion extending from the central portion, and a second end portion extending from the central portion. The electric machine also includes an electrically conductive wire. At least a portion of the wire is wound around one of the teeth of the body and around a portion of at least two cuffs to form a coil, The electric machine also includes a rotor that is rotatably cooperable with the stator and an electronic control for controlling the flow of an electrical current to the coils.

The methods, systems, and apparatus described herein facilitate efficient and economical assembly of an electric machine. Exemplary embodiments of methods, systems, and apparatus are described and/or illustrated herein in detail. The methods, systems, and apparatus are not limited to the specific embodiments described herein, but rather, components of each apparatus and system, as well as steps of each method, may be utilized independently and separately from other components and steps described herein. Each component, and each method step, can also be used in combination with other components and/or method steps.

When introducing elements/components/etc. Of the Methods and apparatus described and/or illustrated herein, the articles "a", "an", "the", and "the" are intended to mean that there are one or more of the element(s)/component(s)/etc. The terms "comprising", "including", and "having" are intended to be inclusive and mean that there may be additional clement(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art, Such other examples are intended to be within the scope of the claims if they have structural elements that do not differ from the literal language of the claims, or if they include equivalent structural elements with insubstantial differences from the literal language of the claims.

Described herein are exemplary methods, systems and apparatus utilizing stator core liners that reduce costs or provide additional space for winding the motor. Furthermore, the exemplary methods system and apparatus achieve increased efficiency while reducing or eliminating an increase of the length of the machine. The methods, system and. apparatus described herein may be used in. any suitable application. However, they are particularly suited for HVAC and pump applications.

Exemplary embodiments of the stator core liners are described above in detail. The electric machine and its components are not limited to the specific embodiments described herein, but rather, components of the systems may be utilized independently and separately from other components described herein. For example, the components may also be used in combination with other machine systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such ether examples are intended to be within the scope of the claims if they have structural elements that do not differ from the literal language of the claims, or if they include equivalent structural elements with insubstantial differences from the literal languages of the claims,

What is claimed is:

1. A stator assembly comprising:
   a body defining a plurality of teeth extending inwardly toward a center of said body, said teeth defining a plurality of cavities, each of said plurality of cavities positioned between adjacent teeth, said body defining opposed first and second planar external faces, each of said teeth and each of the cavities extending from the first face to the second face;
   a plurality of liners, each of said plurality of liners including a central portion for positioning in a cavity between adjacent teeth formed in the stator, a first end portion extending from said central portion and in engagement with a first planar external face of said body, and a second end portion extending from said central portion and in engagement with a second planar external face of said body; and
   electrically conductive wire, at least a portion of said wire wound through one of the cavities formed by the teeth of the body, over the first planar external face, through an adjacent cavity formed by the teeth of the body, and over the second planar external face to form a first coil wound around one of the teeth of the body, at least a portion of said wire wound similarly around each of the other teeth of the body to form additional coils, said wire forming each of the coils being solely supported by the liners, said first coil and the first planar external face defining a substantial cavity formed between said first coil and the first planar external face for providing space for providing end turns and connections.

2. The stator assembly in accordance with claim 1, wherein said body comprises a first longitudinally extending shape and a second hollow circular shape to which said body is formed from first longitudinally extending shape.

3. The stator assembly in accordance with claim 1, wherein said plurality of liners comprise a plurality of insulating cuffs.

4. The stator assembly in accordance with claim 1, wherein said body comprises a plurality of laminations.

5. The stator assembly in accordance with claim 2, wherein said body is welded in the second shape after being so formed.

6. The stator assembly in accordance with claim 1, wherein said body comprises a plurality of living hinges positioned between adjacent teeth.

7. The stator assembly in accordance with claim 1, wherein at least one of said first end portion and said second end portion include a lip for cooperation with said respective end face.

8. The stator assembly in accordance with claim 1, wherein said central portion defines a longitudinally extending rib extending from the first end portion to the second end portion.

9. The stator assembly in accordance with claim 1, wherein said central portion defines an opening extending from the first end portion to the second end portion.

10. The stator assembly in accordance with claim 1, wherein at least a portion of said wire wound is similarly around each of the other teeth of the body to form additional coils, said wire forming each of the coils being solely supported by the liners, said first coil and the first planar external face defining additional substantial cavities, one of the additional substantial cavities formed between each of said additional coils and the first planar external face and between each of said additional coils and the second planar external face for providing space for providing end turns and connections.

11. A method for making an electric machine, said method comprises the steps of:
   providing a generally extending and at least partially resilient body with first and second opposed and spaced apart ends and defining a plurality of teeth extending from the body, the body defining opposed first and second planar external faces, each of the teeth extending from the first face to the second face;
   positioning the resilient body in a generally linear orientation;
   providing a plurality of insulating cuffs, each cuff having a lip on each of the opposed ends thereof;
   inserting at least one of the plurality of cuffs in a cavity formed between adjacent teeth of the body, with one of the opposed lips positioned over each of the opposed first and second planar external faces of the body;
   inserting a liner support between the lips of adjacent cuffs and over the first planar external face of the body;
   providing wire for use in the stator assembly;
   winding the wire through one of the cavities formed by the teeth of the body, over one of the opposed lips of the cuffs, over the support liner, and over another of the opposed lips of the cuffs, through an adjacent cavity formed by the teeth of the body, and over one of the cuffs and the second planar external face to form a coil, the wire forming the coil being solely supported by the insulating cuffs and the liner support;
   moving the first and second ends of the body toward each other to form a generally hollow circular shape;
   removing the liner support;
   providing end turns and connections to the stator assembly; and
   assembling a rotor into the stator to form the electric machine.

12. The method in accordance with claim 11, wherein providing said body comprises providing a plurality of laminations.

13. The method in accordance with claim 11, further comprising welding the body once the second generally hollow circular shape is so formed.

14. The method in accordance with claim 11, wherein providing said generally extending and at least partially resilient body comprises providing a plurality of living hinges positioned between adjacent teeth.

15. The method in accordance with claim 11, further comprising providing an electronic control for controlling the flow of an electrical current to the coils.

16. The method in accordance with claim 11:
   wherein the step of inserting a liner support between the lips of adjacent cuffs and over the first planar external face of the body comprises inserting a liner support between the lips of each of the adjacent cuffs and over the first planar external face of the body as well as inserting a liner support between the lips of each of the adjacent cuffs and over the second planar external face of the body;
   wherein the step of winding the wire comprises winding the wire through one of the cavities formed by the teeth of the body, over the support liner and the first planar external face, through an adjacent cavity formed by the teeth of the body, and over another support liner and the second planar external face to form a coil, at least a portion of said wire wound similarly around each of the other teeth of the body to form additional coils, the wire forming the coils being solely supported by the liners and the liner supports; and
   wherein the step of removing the liner support comprises removing all the support liners.

17. A method for making an electric machine, said method comprises the steps of:
   providing a body defining opposed first and second planar external faces and defining a plurality of teeth extending inwardly from the body, each of the teeth extending from the first face to the second face;
   providing a plurality of insulating cuffs, each cuff having opposed lips;
   inserting at least one of the plurality of cuffs in a cavity formed between adjacent teeth of the body, with one of the opposed lips positioned over each of the opposed first and second planar external faces of the body;
   inserting a liner support between each of the opposed lips of the cuffs
   providing wire for use in forming a stator assembly;
   winding the wire through one of the cavities formed by the teeth of the body, over one of the opposed lips of the cuffs, over the support liner, and over another of the opposed lips of the cuffs, through an adjacent cavity formed by the teeth of the body, and over one of the cuffs and the second planar external face to form a coil, the wire forming the coil being solely supported by the insulating cuffs and the liner support;
   removing the liner support;
   providing end turns and connections to the stator assembly; and
   assembling a rotor into the stator assembly to form the electric machine.

18. The method in accordance with claim 17:
   wherein the step of inserting a liner support between the lips of adjacent cuffs and over the first planar external face of the body comprises inserting a liner support between the lips of each of the adjacent cuffs and over the first planar external face of the body as well as inserting a liner support between the lips of each of the adjacent cuffs and over the second planar external face of the body;
   wherein the step of winding the wire comprises winding the wire through one of the cavities formed by the teeth of the body, over the support liner and the first planar external face, through an adjacent cavity formed by the teeth of the body, and over another support liner and the second planar external face to form a coil, at least a portion of said wire wound similarly around each of the other teeth of the body to form additional coils, the wire forming the coils being solely supported by the liners and the liner supports; and
   wherein the step of removing the liner support comprises removing all the support liners.

* * * * *